United States Patent [19]

Erickson

[11] 4,408,484

[45] Oct. 11, 1983

[54] TEMPERATURE COMPENSATED GAUGE FOR PRESSURIZED GAS SUCH AS NATURAL GAS FUEL FOR VEHICLES

[75] Inventor: Roman R. Erickson, Kansas City, Kans.

[73] Assignee: Gas Service Energy Corporation, Kansas City, Mo.

[21] Appl. No.: 270,628

[22] Filed: Jun. 4, 1981

[51] Int. Cl.³ ............................................. G01F 17/00
[52] U.S. Cl. ..................................... 73/149; 73/708; 73/734
[58] Field of Search .................. 73/149, 290 B, 301, 73/708, 734; 374/143; 340/60, 614, 626

[56] References Cited

U.S. PATENT DOCUMENTS

| | | | |
|---|---|---|---|
| 1,786,566 | 12/1930 | Hastings | 73/714 |
| 2,091,848 | 8/1937 | Eggers | 374/143 |
| 2,285,151 | 6/1942 | Firestone | 73/149 |
| 2,409,073 | 10/1946 | Sias et al. | 73/304 C |
| 2,614,422 | 10/1952 | Payne | 73/861 |
| 2,956,251 | 10/1960 | Goeppinger et al. | 73/734 |
| 3,064,478 | 11/1962 | Schafer | 73/708 |
| 3,301,062 | 1/1967 | Reesby et al. | 73/705 |
| 3,411,351 | 11/1968 | Schwartz | 73/149 |
| 3,528,293 | 9/1970 | Brandau et al. | 73/386 |
| 3,596,510 | 8/1971 | Paine | 73/149 |
| 3,670,575 | 6/1972 | Emerick | 128/142.2 |
| 3,875,801 | 4/1975 | Bishaf | 128/142.2 |
| 3,934,479 | 1/1976 | Posnansky | 73/368.6 |
| 3,967,188 | 6/1976 | Spencer | 73/708 |
| 4,000,643 | 1/1977 | Pearson | 73/708 |
| 4,038,532 | 7/1977 | Burris | 374/143 |
| 4,198,867 | 4/1980 | Olsen | 73/704 |
| 4,206,655 | 6/1980 | Miyamae | 73/708 |
| 4,214,474 | 7/1980 | Bleidt et al. | 73/30 |
| 4,226,125 | 10/1980 | Waugh | 73/708 |

Primary Examiner—Donald O. Woodiel
Attorney, Agent, or Firm—Schmidt, Johnson, Hovey & Williams

[57] ABSTRACT

A temperature compensated gauge for measuring and indicating the quantity of a gas within a pressurized system is provided, which, in addition to achieving a degree of accuracy appropriate for most practical applications, is characterized by qualities of simplicity, reliability and ruggedness. The last-mentioned qualities render the improved gauge especially suited for use in possibly adverse environments, such as for monitoring the remaining supply of compressed natural gas or analogous fuels on board a moving vehicle. The improved gauge is predominantly electrical in nature and employs a limited number of commonly available and relatively inexpensive components, which enhances its practicality for wide spread utilization in virtually any application where measurements of the pressure of any confined gas must be compensated for the effects of temperature in order to provide an accurate indication of the quantity of gas in the system under variable ambient temperature conditions.

18 Claims, 2 Drawing Figures

TEMPERATURE COMPENSATED GAUGE FOR PRESSURIZED GAS SUCH AS NATURAL GAS FUEL FOR VEHICLES

BACKGROUND OF THE INVENTION

1. Field of the Invention

This invention relates to improved gauge apparatus for measuring and indicating the quantity of a pressurized gas within a confining zone based upon sensings of pressure and temperature. More particularly, such apparatus is concerned with employing electrical techniques for continuously and automatically compensating sensings of the pressure of the gas in accordance with the temperature of the gas to provide an accurate on-going indication of the quantity of the gas currently within the zone of interest, even in applications in which gas is being withdrawn from the mentioned zone. By virtue of its attributes of simplicity, reliability, ruggedness and relatively low cost, the invention has special immediate applicability for providing fuel gauges suitable for use in vehicles powered from compressed natural gas or other pressurized gaseous fuels, although it will be understood that the invention has wider potential applicability in virtually any situation requiring the gauging of the quantity of a pressurized gas within a given zone or system.

2. Description of the Prior Art

It has, of course, long been known from the Ideal Gas Law of elementary physics that the quantity (e.g., number of moles) of an "ideal" gas confined within a given volume is proportional to the pressure of the confined gas divided by its temperature multiplied by a constant (e.g., the "ideal gas constant") consistent with the assumption of an "ideal" gas and the units of measure chosen (e.g., atmospheres for pressure and degrees Kelvin for temperature). It has also been heretofore recognized that, although the general relationship represented by such law still applies in a qualitative sense (and, frequently, to a very close approximation in a quantitative sense) when real gases are involved, the applicable constant of proportionality will be influenced by specific gravity or density of the particular gas involved and, perhaps, other factors. it is also known, therefore, that the actual relationship between the quantity, the pressure and the temperature of a particular confined gas may need to be determined or confirmed empirically for greatest accuracy of subsequent measurement, even though such relationship will typically be found to follow the Ideal Gas Law to a surprisingly close approximation.

It is also known that various approaches to applying some form of compensation for temperature to measurements of the pressure of a gas have been proposed. A first group of previously proposed arrangements for such purpose of which I am aware, in which the compensation for temperature is sought to be effected through primarily "mechanical" means, are the Posnansky U.S. Pat. No. 3,934,479 (altering the volume of a pressure sensing chamber), the Olsen U.S. Pat. No. 4,198,867 (altering the tension of a vibrating wire), the Miyamae U.S. Pat. No. 4,206,655 (altering the effective dimension of a base supporting pressure sensing components), and the Bleidt et al U.S. Pat. No. 4,214,474 (altering the condition of a bimetallic element). A second group of previously proposed arrangements relating to some form of temperature compensation in connection with the measurement of the pressure of a gas of which I am aware, in which the compensation for temperature is sought to be effected through primarily electrical or electro-optical means, are the Reesby et al U.S. Pat. No. 3,301,062 (employing a light source, a mirror, a pair of photocells, a manually rotatable support for the latter, a helical type fused quartz tube pressure sensor for rotating the mirror relative to the light source and the photocells, a potentiometer for electrically representing the position to which the support for the photocells is manually rotated, a nul meter and an electrical circuit including a temperature sensitive thermistor), the Brandau et al U.S. Pat. No. 3,528,293 (employing an electrical circuit requiring multiple reference voltage inputs, a thermistor and a servosystem), the Pearson U.S. Pat. No. 4,000,643 (employing operational amplifiers and a resistance network), and the Waugh U.S. Pat. No. 4,226,125 (employing piezoresistors, electronic gate circuitry and timed sampling techniques). The last mentioned group of patents involve proposed arrangements that may be generally characterized by their relative complexity and apparent better suitability for implementation in a laboratory type environment than in practical applications in the field such as primarily contemplated by the present invention.

Although no claim is made herein with respect to any individual electrical component per se, the existence of such components as negative temperature coefficient type thermistors and potentiometers in electrical measuring or gauging circuits should, perhaps, be here confirmed as of itself relatively common in a general sense, for example in the Sias et al U.S. Pat. No. 2,409,073 (involving an electrical circuit arrangement for the gauging of a liquid fuel supply in which a negative temperature coefficient resistance was utilized in connection with an oscillator for compensating for the effects of temperature upon the frequency representative of the measurement made), and the Payne U.S. Pat. No. 2,614,422 (involving an electrical arrangement employing variable resistances for measuring the rate of consumption of a liquid fuel and estimating the time duration before exhaustion of the latter).

Thus, although I am aware of the conventionality of certain of the individual components employed in implementing the present invention, which is one of its practical virtues, I am not aware of anyone having previously combined such components in a similar circuit arrangement for similar purposes or with the accomplishment of similar results. Indeed, the practical state of the prior art is thought to be essentially that, although more elaborate and expensive types of equipment particularly suited for use in a laboratory environment may have been available for at least theoretically accomplishing temperature compensated measurements of pressure of a confined gas, factors such as the very complexity of such equipment, its relatively high costs and/or its inherent lack of ruggedness and reliability under field conditions has heretofore essentially brought about a situation in which those concerned with providing some form of gauging for tank carried gasses in adverse environments, such as in systems for powering vehicles with compressed natural gas or similar fuels, have apparently concluded that any attempt to compensate for the effects of temperature in such installations would be impractical and have, therefore, elected to provide merely a measurement and indication of the pressure of the confined fuel as a rough approximation of the pressurized gas fuel supply that may remain.

It is upon that background of previous absence of a practical means for providing accurate gauging of the quantity of a pressurized gaseous fuel supply remaining available on a vehicle or the like that the present invention has been developed to provide a solution to the problem suited by its nature and characteristics for widespread usage in appropriate applications, such as the increasing number of vehicles that are expected to be powered in the future from compressed natural gas or similar fuels because of economic and other energy related considerations.

SUMMARY OF THE INVENTION

The present invention is intended to overcome the above noted limitations and disadvantages of previous approaches to the gauging of the quantity of a confined gas under pressure, especially in environments and applications in which simplicity, ruggedness, reliability and the cost factors associated with both initial installation and subsequent maintenance requirements are significant in determining practicality, by utilizing an improved, predominately electrical arrangement of circuitry employing conventional components for making such measurements and for providing a convenient indication thereof that will take into account the effects of temperature upon such measurements and appropriately compensate therefor to present an accurate indication of the quantity of the confined gas being monitored. Another important object of the invention is to provide such improved gauging apparatus which, after initial or infrequent calibration and adjustment thereof, will function automatically and without operator intervention to provide the desired gauging and indicating functions on a continuous basis.

The improved gauging apparatus provided by the invention may employ an ordinary electrical meter adapted to respond to a difference in the electrical potentials respectively applied to its terminals, or the flow of current resulting from such potential difference, as its indicating component. A regulated, direct current power source is then employed to apply a reference level potential to one terminal of the meter through a circuit including an adjustable resistance for establishing full scale calibration for the meter and a potentiometer for "zeroing" the meter to some predetermined minimum pressure level. A second electrical circuit for applying a second potential to the other terminal of the meter employs a potentiometer whose tap is continuously controlled by a pressure sensor such as a Bourdon tube communicated with the supply of gas being monitored and a resistance network including a temperature sensing element such as a thermistor disposed to sense the temperature of such gas. The electrical potential applied to the last mentioned terminal of the meter electrically combines the effects of the sensings of the pressure and the temperature of the gas in such manner as to actuate the meter for providing an indication of the pressure of the gas appropriately compensated for its temperature to provide an accurate indication of the quantity of gas remaining in the zone or system being monitored.

Significant details of the improved apparatus will be further described with reference to a preferred embodiment of the invention hereinafter.

DESCRIPTION OF THE PREFERRED EMBODIMENT

Figure 1:
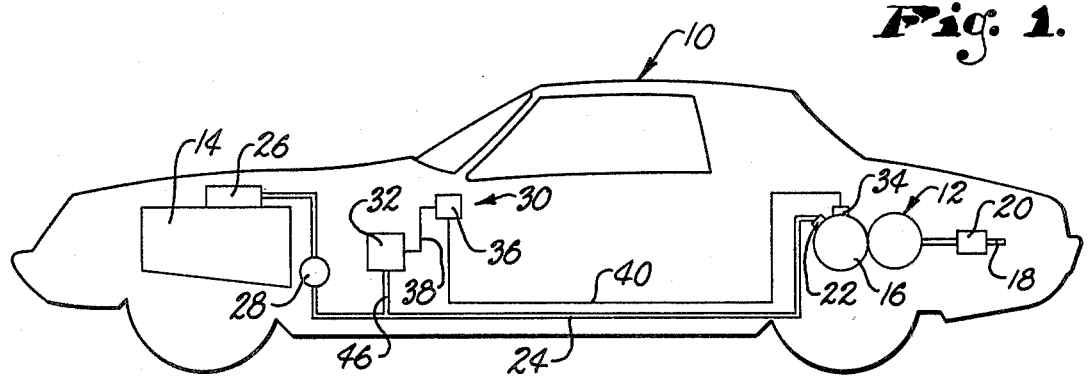
FIG. 1 is a schematic depiction of a vehicle showing certain primary aspects of a compressed natural gas fuel system therefor and illustrating the manner in which the improved gauging apparatus of this invention may be associated therewith in a preferred embodiment.

The problem solved by the improved gauging apparatus provided by the invention is well illustrated by the need to include in vehicles equipped for operation upon compressed natural gas or similar fuels some means for measuring and indicating to the operator of the vehicle the quantity of such fuel remaining in its fuel storage system. The currently preferred embodiment of the invention relates to that application, and description of such preferred embodiment should amply illustrate the principles of the invention, which those skilled in the art will perceive have much wider applicability to that general class of gauging functions involving a need for accurate measurement of the quantity of a pressurized gas within some zone of confinement thereof, especially in environments where ruggedness, reliability and automatic continuous operation are also important.

Certain parameters of the electrical circuitry arrangement employed by the invention will optimumly be selected in the light of the particular gas to be gauged, and particularly the effects of the temperature of the gas upon measurements of quantity otherwise based upon its pressure, and, in cases where that relationship may not already have previously been determined and be readily available, it can be empirically determined, preferably giving due attention to the particular range of pressures and temperatures expected to be involved. With compressed natural gas having typical characteristics including a specific gravity of about 0.65, it is known that, assuming a normal filling pressure of 2,400 psig at 70° Fahrenheit for the storage tanks or system to be monitored, the pressure of a "full tank" of such gas stored at 2,400 psig and 70° F. will vary in either direction by increments closely approximating 100 psig per 10° F. of temperature change from 70° F. within a normal range of interest of ambient temperatures between about 120° F. and about −20° F. By the same token, "full tank" filling at a temperature of 80° F. would involve charging the tank system with such compressed natural gas to a pressure of 2,500 psig, "full tank" filling at a temperature of 40° F. would involve charging at a pressure of 2,100 psig, etc. Similarly, during use of the vehicle with such gaseous fuel at 70° F., a pressure of 1,200 psig should indicate that one-half of a "full tank" quantity of the gas remains, while the same pressure of 1,200 psig with the gas at a temperature of 10° F. should indicate approximately one-fourth of a "full tank" remaining. The mentioned relationship of the quantity of the confined gas to its pressure and temperature holds for the described, typical compressed natural gas fuel to an accuracy of better than 5% within the mentioned range of interest normally encountered in the gauging of compressed natural gas fuel supplies for vehicles. As those familiar with the field of powering vehicles with compressed natural gas fuels will be aware, the prevailing safety and design practices contemplate that all relevant parts of the system will normally be constructed to accommodate with an appropriate safety factor to a pressure of 2,400 psig at a gas temperature 70° F. and to also so accommodate to the variations in pressure that will result from changes of temperature of the gas within the range of operating conditions to be encountered.

Referring next to FIG. 1 of the drawings, there is illustrated a vehicle 10 having a compressed natural gas fuel system broadly designated 12 for powering the internal combustion engine 14 of the vehicle 10. Although such a fuel system 12 normally will include a number of other components and controls not especially germaine to the present invention, certain of the conventional, primary components of the system 12 are illustrated in FIG. 1 and include one or more fluid interconnected high pressure, compressed natural gas storage tanks 16, a filling pipe 18 connected with the tanks 16 and having a check valve 20 interposed therein for use in recharging the tanks 16 with compressed natural gas fuel, a shutoff valve 22 adjacent the tanks 16 for permitting or precluding the flow of pressurized natural gas from the tanks coupled with the feed line 24 as indicated by the arrow 44 in FIG. 2 and the conduit 46 in FIG. 1. The deformable tube 42 is mechanically coupled, as indicated by the dotted line 48, with the movable tap 50 of an electrical potentiometer 52. As the tube 42 is deformed in predetermined manner in response to the pressure of the gas being applied thereto from the feed line 24, the tube 42 moves the tap 50 of the potentiometer 52 in a predeterminedly corresponding manner to vary the electrical resistance of the potentiometer 52 on the opposite sides of the tap 50, so that the potentiometer 52 and its tap 50 function as a voltage divider when an electrical potential is applied across the ends of the potentiometer 52 as hereinafter described. Thus, the pressure sensor 32 operates as a transducer for converting the level of gas pressure applied to the tube 42 from the gas feed line 24 into an electrical resistive impedance parameter of magnitude having a predetermined relationship of correlation with the applied pressure.

The temperature sensor 34 is preferably in the nature of a thermistor 54 having a negative temperature coefficient such that its effective resistance varies in a predetermined inverse manner to the temperature to which it is subjected 16 into a feed line 24 leading to a fuel/air mixer 26 associated with the engine 14 through one or more pressure reducing regulators as at 28. Certain primary parts of the gauging apparatus provided by this invention are also illustrated in FIG. 1 to provide a general overview of a typical association between such parts and certain of the mentioned components of the gaseous fuel system 12. The gauging apparatus of the invention is broadly designated 30 and includes a pressure sensor 32 in fluid communication with the feed line 24, a temperature sensor 34 in association with the fuel storage tanks 16, a gauge indicator and control unit 36 typically disposed adjacent the dashboard or instrument panel of the vehicle 10, and electrical connections between the unit 30 and the pressure and temperature sensors 32 and 34 respectively indicated in FIG. 1 by the lines 38 and 40.

Figure 2:
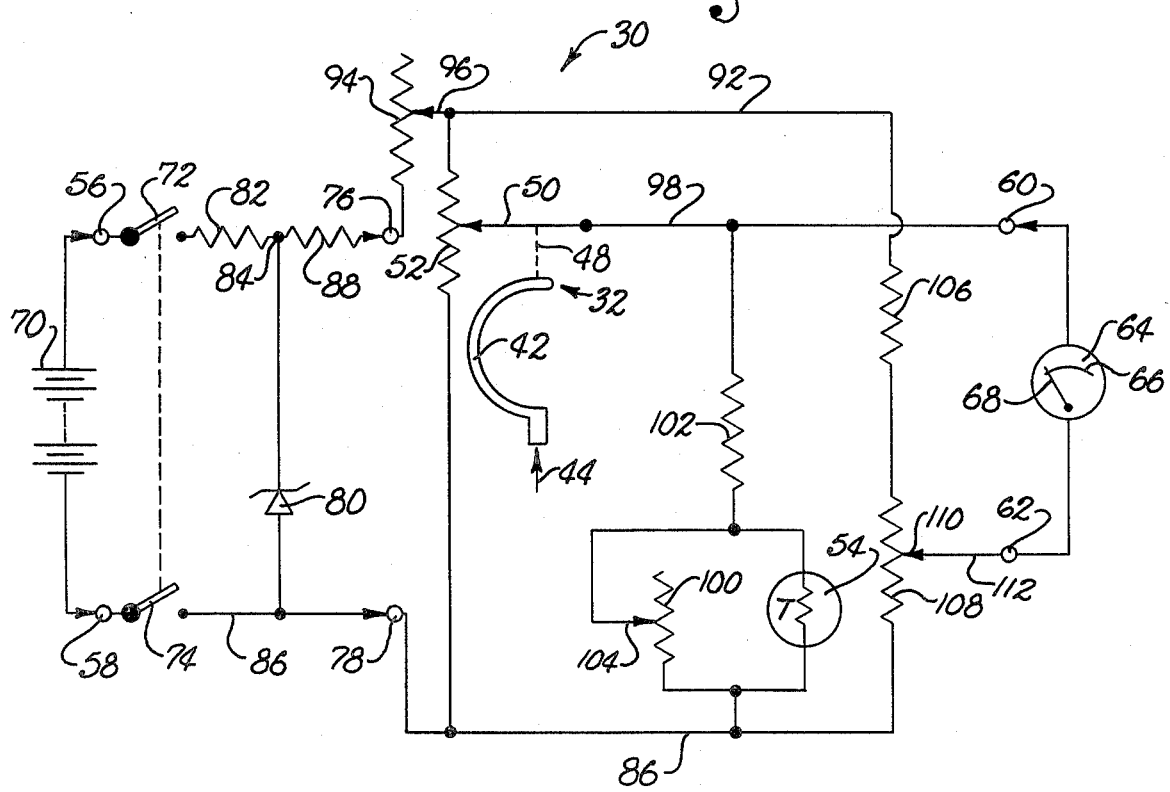
FIG. 2 is a schematic diagram showing the components and electrical circuitry of the currently preferred embodiment of the improved gauging apparatus provided by the invention.

The preferred form of the gauging apparatus 30 for use in a vehicle 10, including the electrical components and circuitry employed therein, is shown in greater detail in FIG. 2 of the drawings, to which reference is now made.

The pressure sensor 32 is a conventional, bent Bourdon tube type pressure transducer having a pressure responsive, deformable, resilient, metal tube 42 having the general shape illustrated and fluid and in known correlation with the latter. The thermistor 54 is small and can be associated with the gas in the tanks 16 or the feed line 24 in various ways. However, since the tanks 16 will normally be formed of heat conductive metal, it has been found satisfactory for practical purposes to simply associate the thermistor 54 in thermally coupled relationship with one of the tanks 16, which is regarded as preferable from the standpoint of convenience and has been found to provide a sufficiently accurate measurement of the temperature of the gaseous fuel within the tanks 16 to provide the required degree of accuracy of temperature compensation needed in a system 30 for monitoring the quantity of gaseous fuel remaining in a vehicle 10. As those skilled in the art will appreciate, if an even more exact monitoring of the temperature of a confined gas should be desired in a system for some different purpose, the thermistor 54 could be more directly or intimately associated with the confined gas itself.

The gauge indicator and control unit 36 will preferably include input terminals 56 and 58 to which a suitable source of direct current electrical power may be coupled, and output terminals 60 and 62 to which a suitable indicating device 64 may be coupled. In the preferred embodiment of the invention for use in a fuel monitoring system for a vehicle 10, the indicating device 64 is provided by a conventional electrical meter having a suitably calibrated scale 66 and a shiftable pointer 68 that is appropriately moved in correlation with the current flow through the meter in response to the electrical potential applied across its associated terminals 60 and 62. A microammeter of suitable range is quite satisfactory as the component for providing the indicator device 64. Those skilled in the art will appreciate that the indicator device 64 might as a matter of choice also be implemented with any desired different form of electrically responsive indicating component, such as one providing a digital type indication of the electrical potential or electrical current flow between the terminals 60 and 62.

The direct current power source 70 preferably employed in apparatus 30 for use in a vehicle 10 is simply the battery conventionally provided in the vehicle 10 and typically adapted to supply direct current power to the terminals 56 and 58 of a potential of approximately 12 volts. Either of the power terminals 56 and 58 may be "grounded", if desired, without adversely affecting the operation of the apparatus 30. For convenience of explanation, however, it may be assumed that the power terminal 56 is at a positive electrical potential relative to the power terminal 58. If desired, and especially in applications other than in a vehicle 10, the power source 70 may be provided by a rectifier coupled with a source of alternating current power or, in general, any other form of power supply adapted to provide direct current electrical power of a suitable potential for use with the other components selected for employment in the circuitry of the apparatus 30.

An on/off switch 72–74 is preferably provided on or adjacent to unit 36 between the power terminals 56 and 58 and the remainder of the circuitry of the apparatus 30, in order that the latter may be deactivated when desired. Such function may also be implemented through suitable connections with the ignition switch of the vehicle 10, which may supplant the need for a separate control switch 72–74.

It is important to the accurate operation of the apparatus 30 that the electrical potential supplied to a pair of regulated potential points 76 and 78 of the circuitry of the apparatus 30 be well regulated. In the preferred embodiment of the invention illustrated, such regulation is accomplished through the use of resistances 82 and 88 in series with the positive supply line 84 and a shunt circuit having a Zener diode 80 connected from the line 84 between the resistances 82 and 88 to the negative supply line 86. In the preferred embodiment of the apparatus 30 for use on the vehicle 10, the components 80, 82 and 88 are selected to provide a well regulated direct current potential of, say, 9.1 volts across the points 76 and 78 when the power terminals 56 and 58 are supplied with direct current power of approximately 12 volts.

The regulated positive terminal 76 is coupled with a positive potential reference lead 92 through a rheostat or other variable resistance 94 having a manually adjustable tap 96 that can preferably be controlled from a location on or adjacent the unit 36. The rheostat 94 is used for adjusting the indicating device or meter 64 for proper full scale calibration of the latter, as hereinafter further referred to, which is an adjustment that typically will need to be made only during assembly or installation of the apparatus 30 and, perhaps, at infrequent intervals thereafter.

It may now be observed that the resistance of the potentiometer 52 of the pressure sensor 32 is electrically coupled between the positive reference potential line 92 and the negative supply line 86 in the manner of a voltage divider relative to the shiftable tap 50 thereof, and that the electrical potential derived from the tap 50, whose positioning is continuously controlled by the sensor 32 in response to the pressure being applied to the tube 42, is applied to a circuit branch in the nature of an output line 98 coupled with the output or meter terminal 60.

The thermistor 54 has associated therewith a shunt resistance 100, preferably of the variable or rheostat type having a manually adjustable tap 104, and a series resistance 102. One end of the shunted thermistor 54 and resistance 100 set is coupled with the negative supply line 86. The opposite end of the thermistor 54 and the tap 104 of resistance 100 are coupled through the resistance 102 with the output line 98. The shunt resistance 100 and series resistance 102 are thus associated with the thermistor 54 for purposes of adjusting for the temperature alterable resistance characteristics of the particular thermistor 54 being used to appropriately "track" with the other parameters with which the circuitry of the apparatus 30 is implemented, that is, to set the amount of change in the effective resistance presented between the lines 98 and 86 by the combination of the thermistor 54, resistance 100 with the meter terminal 62 through a branch lead 112. The potentiometer 108 is provided for use in adjusting the meter 64 for proper "zeroing" of the pointer 68, which adjustment will typically be required only during initial assembly or installation or, perhaps, at infrequent intervals thereafter. It will be observed that the adjustment of the tap 110 of the zeroing potentiometer 108 determines the level of an electrical reference potential applied to the meter terminal 62, relative to which the variable electrical potential representing a temperature compensated pressure measurement applied to the meter terminal 60 may act in producing a flow of current through the meter 64 to be measured and indicated by the latter. It is, of course, the same mentioned difference in potential between the terminals 60 and 62 that would be sensed, measured and indicated by any alternate form of device 64 that might be employed in lieu of an ordinary electrical meter; for example, the device 64 might be implemented with a conventional analog/digital converter module coupled with the terminals 60 and 62 and having means associated therewith for providing a digital type "read out" or measurement indication.

Those skilled in the art will, of course, not only recognize that the exact component types and resistance 102 to an appropriately selected amount per degree of change in the temperature of the gas being monitored by the thermistor 54. The adjustment of the tap 104 of the rheostat 100 will be done manually, preferably at or adjacent the unit 36, but will typically be required only during initial assembly or installation of the apparatus 30 and, perhaps, infrequently thereafter. Those skilled in the art will understand that such permitted adjustment of the rheostat 100 may be used to compensate for minor deviations in the temperature/resistance response of an individual thermistor component 54 from the center of tolerance characteristics of its general component type and may, therefore, actually be unnecessary where thermistor components 54 that have been subjected to tight tolerance limits and quality control testing are employed, in which latter case a fixed resistance might be substituted for the rheostat 100.

It will be observed that the thermistor 54 and its associated resistances 100 and 102 are effectively coupled in shunt with whatever portion of the resistance of the pressure responsive potentiometer 52 lies between the tap 50 thereof and the negative line 86, in such manner as to thereby alter the voltage divider action of the potentiometer 52 to modify the level of the potential applied to the output line 98. As those skilled in the art will appreciate, presuming appropriate selection of the resistances of the potentiometer 52, the rheostat 100, the resistance 102 and the thermistor 54, the negative change in resistance of the latter to increasing temperature (or vice versa) may be arranged to provide exactly that modification of the electrical potential that would otherwise be applied to the branch output line 98 from the pressure responsive tap 50 of the potentiometer 52 as is needed to effect proper compensation for the temperature of the particular gas being monitored (for example, to provide for modification of the potential that would otherwise be applied to the line 98 basically representing the measured pressure of the gas in a manner providing approximately 100 psig compensation for each 10° F. of change in the temperature of a typical compressed natural gas fuel, consistently with the above mentioned characteristics of the latter).

Another voltage divider arrangement is provided between the positive line 92 and the negative line 86 and includes a padding resistance 106 in series with the resistance of a potentiometer 108 having a manually adjustable tap 110 coupled with the meter terminal 62 through a branch lead 112. The potentiometer 108 is provided for use in adjusting the meter 64 for proper "zeroing" of the pointer 68, which adjustment will typically be required only during initial assembly or installation or, perhaps, at infrequent intervals thereafter. It will be observed that the adjustment of the tap 110 of the zeroing potentiometer 108 determines the level of an electrical reference potential applied to the meter terminal 62, relative to which the variable electrical potential representing a temperature compensated pressure measurement applied to the meter terminal 60 may act in producing a flow of current through the meter 64 to be measured and indicated by the latter. It is, of course, the same mentioned difference in potential between the terminal 60 and 62 that would be sensed, measured and indicated by any alternate form of device 64 that might be employed in lieu of an ordinary electrical meter; for example, the device 64 might be implemented with a conventional analog/digital converter module coupled with the terminals 60 and 62 and having means associated therewith for providing a digital type "read out" or measurement indication.

Those skilled in the art will, of course, not only recognize that the exact component types and values thereof to be employed in the apparatus 30 may differ either with the characteristics of the particular pressurized gas to be monitored or with the selection of types and values for the other components, but also will be familiar with the design procedures to be followed in selecting an appropriate set of component types and values for monitoring the supply of various pressurized gasses having particular characteristics within a pressure and temperature range of interest. It is to be understood, therefore, that the invention involved in the improved gauging apparatus 30 should not be regarded as restricted to the particular component values employed in the preferred embodiment of the invention for use with a vehicle 10 and the mentioned compressed natural gas fuel. Nevertheless, for the benefit of those who may not have previous experience or skill with the type of circuitry involved, further information will next be provided regarding the component types and values employed in the preferred embodiment of the invention for use in monitoring the remaining supply of compressed natural gas fuel in a vehicle 10, with the characteristics of such fuel being assumed to be typical for natural gas, including a specific gravity of about 0.65.

The meter 64 may be an ordinary, panel mountable, 50 microampere microammeter having an internal coil resistance of 2,350 ohms, such as the Model TK-134 manufactured and marketed by Mura Corporation of Waterbury, N.Y. The pressure transducer 32 may be of the type previously described, such as the Model 9000 unit manufactured and marketed by Vernitron Corporation of Deer Park, N.Y., in which the potentiometer portion has a resistance of 2,000 ohms corresponding to a maximum pressure sensing of 3,000 psig. The thermistor 54 may be of type M4311471 manufactured and marketed by Mepco/Electra Inc. of Mineral Wells, Tex. The rheostat 94 may have a resistance of 10,000 ohms. The rheostat 100 may have a resistance of 1,000 ohms. The resistance 104 may have a resistance of 470 ohms. The resistance 106 may have a resistance of 12,000 ohms. The potentiometer 108 may have a resistance of 1,000 ohms. The resistance 82 may have a resistance of 390 ohms and the resistance 88 may have a resistance of 10,000 ohms for use with a Zener diode 80 for regulation at 9.1 volts and of 0.5 watt or greater rating.

As will likely be apparent to those skilled in the art from the nature of the apparatus 30 and the preceding description of various aspects thereof, upon installation of the same for commencement of use, the tap 110 of the potentiometer 108 should be set for proper registration of the pointer 68 of the meter 64 with a zero or "empty" indicating portion of the calibrations 66 with the tanks 16 empty (or with the coupling line 46 disconnected from the Bourdon tube 42 of the pressure transducer 32). Similarly, the tap 96 of the rheostat 94 should be set for registering of the pointer 68 of the meter 64 with a "full scale" part of the calibrations 66 while the tanks 16 are loaded with a "full charge" of compressed natural gas fuel either at, for example, 2,400 psig and 70° F. or at the equivalent "full charge" pressure for the temperature at which such gas actually may be. The tap 104 of the rheostat 100 should also be initially set to accommodate to a possible departure from its design characteristics of the thermistor 54, which may be done by those skilled in the art through pretesting of the temperature/resistance characteristics of the individual thermistor component to be used, followed by setting of the tap 104 to provide from the rheostat 100 the resistance needed in shunt with the thermistor 54 to render the effective change of resistance between the line 98 and the line 86 of an appropriate value for each degree of change in the temperature to which the thermistor 54 is subjected within the range of interest, or, if more convenient, the thermistor 54 may be artificially subjected to different temperatures within the range of interest and the tap 104 of the rheostat 100 adjusted to provide the desired "tracking" in accordance with measurements of the changes in resistance presented between the lines 98 and 86 for different temperatures while any pressure applied to the transducer 32 is held constant. If the calibrations 66 provided on the meter 64 include quantitatively labelled markings, the meter 64 itself can be employed to guide proper setting of the tap 104 of the rheostat 100 as the thermistor 54 is subjected to different known temperatures with any pressure applied to the transducer 32 being known and maintained constant.

With the above mentioned initial adjustments made, which should not require resetting except, perhaps, at infrequent intervals as a part of periodic maintenance procedures, the apparatus 30 will then operate automatically and continuously, whenever energized by closure of the switch 72-74, to provide an indication at the meter 64 of the supply of pressurized gas remaining within the fuel system of the vehicle 10, in terms of any suitable calibrations 66 upon the meter 64, but with such indication being essentially equivalent to an accurate representation of the pressure of the gas within the system appropriately compensated for the temperature of such gas.

It will be clear to those skilled in the art that a number of minor modifications or additions might be made to the preferred embodiment of the apparatus provided by the invention without departing from the principles and essence of the latter, as well as that the invention may be utilized with diverse gases including the natural gas fuel referred to for illustrative purposes hereinabove, air or other materials in a pressurized gaseous state. Accordingly, it is to be understood that the invention should be deemed limited only by the claims which follow, when such claims are fairly construed with a scope to encompass mechanically equivalent constructions.

I claim:

1. In apparatus for gauging the quantity of a gas within a system presenting a predetermined volume in which said gas is confined under pressure;

electrically responsive means having a pair of input terminals for measuring the magnitude of an electrical input applied to said input terminals and providing an indication corresponding thereto;

first electrical circuit means adapted for coupling with a source of electrical power and having a branch coupled with one of said input terminals, for applying to said one input terminal a first electrical potential of a preselected reference level;

pressure responsive, variable, electrical impedance presenting means operably associated with said system for presenting a first electrical impedance of variable magnitude influenced by and correlated with the pressure of said gas within said system;

temperature responsive, variable, electrical impedance presenting means operably associated with said system for presenting a second electrical impedance of variable magnitude influenced by and correlated with the temperature of said gas within said system; and second electrical circuit means adapted for coupling with a source of electrical power, having said first and second impedances coupled in series therewith, and having a branch electrically coupling the other of said input terminals with a point of said second circuit means electrically intermediate said first and second impedances for applying to said other input terminal a second electrical potential of variable level influenced by and correlated with combined effects of the respective magnitudes of said first and second impedances.

2. Apparatus as set forth in claim 1, wherein:
said electrically responsive means is located remotely from said pressurized system.

3. Apparatus as set forth in claim 1, wherein:
said electrically responsive means comprises an electrical meter having a calibrated scale and a shiftable indicator associated with the latter.

4. Apparatus as set forth in claim 1, wherein:
said first circuit means is adapted for coupling with the same source of electrical power as said second circuit means, and
said first circuit means includes third and fourth electrical impedances coupled in series therewith, said branch of said first circuit means electrically coupling said one input terminal with a point of said first circuit means electrically intermediate said third and fourth impedances.

5. Apparatus as set forth in claim 4, wherein:
all of said impedances are resistive.

6. Apparatus as set forth in claim 4, wherein:
said third and fourth impedances are provided by first and second resistance portions of a first potentiometer having an adjustable tap electrically coupled therebetween,
said branch of said first circuit means being coupled with said tap of said first potentiometer,
whereby the preselected reference level of said first potential may be adjusted to various selected values.

7. Apparatus as set forth in claim 1, wherein:
said pressure responsive, impedance presenting means includes a bent metallic tube type Bourdon pressure sensor fluid coupled with said system, and
said first impedance is provided by one of a pair of resistance portions of a potentiometer having a shiftable tap electrically coupled therebetween and operably coupled with said sensor for movement by the latter.

8. Apparatus as set forth in claim 7, wherein:
said branch of said second circuit means is coupled with said tap of said potentiometer.

9. Apparatus as set forth in claim 7, wherein:
the other of said pair of resistance portions of said potentiometer is electrically coupled in shunt with said second impedance.

10. Apparatus as set forth in claim 1, wherein:
said second impedance includes a thermistor thermally coupled with said system.

11. Apparatus as set forth in claim 10, wherein:
said thermistor has a preselected non-zero thermal coefficient for the effective resistance presented thereby in relationship to the temperature applied thereto,
whereby to provide temperature compensation corresponding to the effects of temperature upon the pressure of the particular type of gas contained within said system.

12. Apparatus as set forth in claim 11, wherein:
said thermal coefficient of said thermistor is negative.

13. Apparatus as set forth in claim 10, wherein:
said second circuit means includes a shunt resistance coupled in parallel with said thermistor, and a series resistance coupled in series with said thermistor.

14. Apparatus as set forth in claim 13, wherein:
said shunt resistance is adjustably variable,
whereby the change in effective resistance of said thermistor per unit of change of the temperature applied to said thermistor may be selectively set.

15. In temperature compensated apparatus for gauging the quantity of a gas within a pressurized system:
electrically responsive means having a pair of input terminals for measuring the magnitude of an electrical input applied to said input terminals and providing an indication corresponding thereto;

first electrical circuit means coupled with one of said input terminals and adapted for coupling with a source of electrical power, for applying a first electrical potential of a preselected reference level to said one input terminal;

pressure responsive, variable, electrical impedance means operably associated with said system for presenting a first electrical impedance of variable magnitude influenced by and correlated with the pressure of said gas;

temperature responsive, variable, electrical impedance presenting means operably associated with said system for presenting a second electrical impedance of variable magnitude influenced by and correlated with the temperature of said gas; and second electrical circuit means adapted for coupling with a source of electrical power, having said first and second impedances coupled in series therewith, and having a branch electrically coupling the other of said input terminals with a point of said second circuit means electrically intermediate said first and second impedances for applying a second electrical potential of variable level influenced by and correlated with combined effects of the respective magnitudes of said first and second impedances to said other input terminal, said electrically responsive means being located remotely from said pressurized system, said electrically responsive means comprising an electrical meter having a calibrated scale and a shiftable indicator associated with the latter, said first circuit means being adapted for coupling across the same source of electrical power as said second circuit means, said first circuit means including third and fourth electrical impedances coupled in series therewith, and a branch electrically coupling said one input terminal with a point of said first circuit means electrically intermediate said third and fourth impedances, all of said impedances being resistive, one of said third and fourth impedances including a first potentiometer having an adjustable tap, said branch of said first circuit means being coupled with said tap of said first potentiometer, whereby the preselected reference level of said first potential may be adjusted to various selected values, said pressure responsive, impedance presenting means including a bent tube type Bourdon pressure sensor fluid coupled with said system, said first impedance including a second potentiometer having a shiftable tap operably coupled with said sensor for movement by the latter, said branch of said second circuit means being coupled with said tap of said second potentiometer, said second impedance including a thermistor thermally coupled with said system, said thermistor having a negative thermal coefficient for the effective resistance presented thereby to the temperature applied thereto, said second circuit means including a shunt resistance coupled in parallel with said thermistor, and a series resistance coupled in series with said thermistor, and said shunt resistance being adjustably variable, whereby the change in effective resistance of said thermistor per unit of change of the temperature applied to said thermistor may be selectively set.

16. Apparatus as set forth in claim 15, wherein:

said meter is responsive to the level of an electrical current flowing between its said input terminals, and there is provided a variable resistance for use in calibrating said meter coupled in series between said source of electrical power and both of said first and said second electrical circuit means.

17. In apparatus for gauging the quantity of a gas within a system presenting a predetermined volume in which said gas is confined under pressure:

electrically responsive means having a pair of input terminals for measuring the magnitude of an electrical input applied to said input terminals and providing an indication corresponding thereto;

first electrical circuit means adapted for coupling with a source of electrical power and having a branch coupled with one of said input terminals, for applying to said one input terminal a first electrical potential of a preselected reference level;

pressure responsive, variable, electrical impedance presenting means operably associated with said system for presenting a first electrical impedance of variable magnitude influenced by and correlated with the pressure of said gas within said system;

temperature responsive, variable, electrical impedance presenting means operably associated with said system for presenting a second electrical impedance of variable magnitude influenced by and correlated with the temperature of said gas within said system;

second electrical circuit means adapted for coupling with a source of electrical power, having said first and second impedances coupled in series therewith, and having a branch electrically coupling the other of said input terminals with a point of said second conduit means electrically intermediate said first and second impedances for applying to said other input terminal a second electrical potential of variable level influenced by and correlated with combined effects of the respective magnitudes of said first and second impedances, said electrically responsive means being located remotely from said pressurized system, said electrically responsive means comprising an electrical meter having a calibrated scale and a shiftable indicator associated with the latter, said first circuit means including third and fourth electrical impedances coupled in series therewith, said branch of said first circuit means electrically coupling said one input terminal with a point of said first circuit means electrically intermediate said third and fourth impedances, all of said impedances being resistive, said third and fourth impedances being provided by first and second resistance portions of a first potentiometer having an adjustable tap, said branch of said first circuit means being coupled with said tap of said first potentiometer, whereby the preselected reference level of said first potential may be adjusted to various selected values, said pressure responsive, impedance presenting means including a bent tube type Bourdon pressure sensor fluid coupled with said system, said first impedance being provided by one of a pair of resistance portions of a second potentiometer having a shiftable tap electrically coupled therebetween and operably coupled with said sensor for movement by the latter, said branch of said second circuit means being coupled with said tap of said second potentiometer, said second impedance including a thermistor thermally coupled with said system, said thermistor having a preselected non-zero thermal coefficient for the effective resistance presented thereby in relationship to the temperature applied thereto, whereby to provide temperature compensation corresponding to the effects of temperature upon the pressure of the particular type of gas contained within said system, said second circuit means including a shunt resistance coupled in parallel with said thermistor, and a series resistance coupled in series with said thermistor, and said shunt resistance being adjustably variable, whereby the change in effective resistance of said thermistor per unit of change of the temperature applied to said thermistor may be selectively set.

18. Apparatus as set forth in claim 17, wherein: said thermal coefficient of said thermistor is negative.

* * * * *